US010255191B2

(12) United States Patent
Farmahini-Farahani et al.

(10) Patent No.: US 10,255,191 B2
(45) Date of Patent: Apr. 9, 2019

(54) LOGICAL MEMORY ADDRESS REGIONS

(71) Applicant: Advanced Micro Devices, Inc., Sunnyvale, CA (US)

(72) Inventors: Amin Farmahini-Farahani, Santa Clara, CA (US); David A. Roberts, Cambridge, MA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 325 days.

(21) Appl. No.: 15/133,033

(22) Filed: Apr. 19, 2016

(65) Prior Publication Data
US 2017/0046272 A1 Feb. 16, 2017

Related U.S. Application Data

(60) Provisional application No. 62/204,745, filed on Aug. 13, 2015.

(51) Int. Cl.
G06F 12/00 (2006.01)
G06F 12/1009 (2016.01)
(Continued)

(52) U.S. Cl.
CPC ........ *G06F 12/1009* (2013.01); *G06F 3/0604* (2013.01); *G06F 3/0616* (2013.01); *G06F 3/0644* (2013.01); *G06F 3/0665* (2013.01); *G06F 3/0683* (2013.01); *G06F 12/0238* (2013.01); *G06F 12/1408* (2013.01);
(Continued)

(58) Field of Classification Search
None
See application file for complete search history.

(56) References Cited

U.S. PATENT DOCUMENTS

| 8,407,400 B2 | 3/2013 | Marotta et al. |
| 2013/0173931 A1* | 7/2013 | Tzafrir .................... G06F 21/57 713/193 |
| 2013/0219146 A1* | 8/2013 | Confalonieri ....... G06F 12/0246 711/202 |

OTHER PUBLICATIONS

Qureshi, et al., "Morphable Memory System: A Robust Architecture for Exploiting Multi-Level Phase Change Memories", Proceedings of the 37th Annual International Symposium on Computer Architecture, Jun. 19, 2010, pp. 153-162, ACM, New York, NY, USA.

(Continued)

*Primary Examiner* — Baboucarr Faal
(74) *Attorney, Agent, or Firm* — Meyertons Hood Kivlin Kowert and Goetzel PC; Rory D. Rankin

(57) ABSTRACT

Systems, apparatuses, and methods for implementing logical memory address regions in a computing system. The physical memory address space of a computing system may be partitioned into a plurality of logical memory address regions. Each logical memory address region may be dynamically configured at run-time to meet changing application needs of the system. Each logical memory address region may also be configured separately from the other logical memory address regions. Each logical memory address region may have associated parameters that identify region start address, region size, cell-level mode, physical-to-device mapping scheme, address masks, access permissions, wear-leveling data, encryption settings, and compression settings. These parameters may be stored in a table which may be used when processing memory access requests.

20 Claims, 12 Drawing Sheets

(51) Int. Cl.
*G06F 12/14* (2006.01)
*G06F 3/06* (2006.01)
*G06F 12/02* (2006.01)

(52) U.S. Cl.
CPC .. *G06F 12/1441* (2013.01); *G06F 2212/1016* (2013.01); *G06F 2212/1052* (2013.01); *G06F 2212/205* (2013.01); *G06F 2212/401* (2013.01); *G06F 2212/402* (2013.01); *G06F 2212/7201* (2013.01); *G06F 2212/7211* (2013.01)

(56) References Cited

OTHER PUBLICATIONS

"NVM Express™", NVM Express, Inc., Nov. 3, 2014, 205 pages, Revision 1.2, http://nvmexpress.org/wp-content/uploads/NVM_Express_1_2_Gold_20141209.pdf. [Retrieved Feb. 9, 2016].
Fang et al., "Heterogeneous Mini-rank: Adaptive, Power-Efficient Memory Architecture", 2010 39th International Conference on Parallel Processing, Sep. 13-16, 2010, pp. 21-29.

\* cited by examiner

Logical Memory Address Region Table 500

| Logical Memory Address Region ID | Start Address | Region Size | Cell-Level Mode | Physical-to-Device Mapping Scheme | Address Mask | Access Permissions | Wear-Leveling Data | Vendor-Specific Features | ... |
|---|---|---|---|---|---|---|---|---|---|
| 505A | 0x40000000 | 128 MB | 1 bit/cell | 1st Striping | 0xFFFF | R/W/X | 120 cycles | 1 KB row | |
| 505B | 0x48000000 | 256 MB | 2 bits/cell | 2nd Striping | 0xFFEF | R/~W/~X | 56 cycles | 1 KB row | |
| 505C | 0x58000000 | 1 GB | 1 bit/cell | 1st Striping | 0xFFFF | R/W/X | 11 cycles | 2 KB row | |
| ... | ... | ... | ... | ... | ... | ... | ... | ... | |

FIG. 5

LOGICAL MEMORY ADDRESS REGIONS

PRIORITY INFORMATION

This application claims benefit of priority of U.S. Provisional Application Ser. No. 62/204,745 titled "Systems and Methods of Managing Memory Address Ranges Using Logical Memory Address Regions" filed Aug. 13, 2015, whose inventors were Amin Farmahini-Farahani and David A. Roberts, which is hereby incorporated by reference in its entirety as thought fully and completely set forth herein.

The invention described herein was made with government support under contract number DE-AC52-07NA27344 awarded by the United States Department of Energy. The United States Government has certain rights in the invention.

BACKGROUND

Technical Field

Embodiments described herein relate to computer systems and more particularly, to systems and methods of managing memory address ranges in a memory device.

Description of the Related Art

Memory devices, such as double data rate (DDR) devices, dynamic random access memory (DRAM) devices, high bandwidth memory (HBM) devices, and Hybrid Memory Cube (HMC) devices are used for short-term data access in computing systems. These memory devices include a single, contiguous physical address space that is configured at startup and is managed uniformly.

Each type of memory technology (e.g., DRAM, phase-change memory and NAND Flash) includes a variety of physical properties, such as a size (e.g., row size, column size) and counts (e.g., channel count, bank count, rank count, row count), that may differ from sizes and counts of other types of memory technology. Some memory devices using the same technology may also include different physical properties of devices using the same technology. For example, some DRAM devices may include 1 kilobyte (KB) row buffer sizes and other DRAM devices may include 2 KB row buffer sizes.

SUMMARY

Systems, apparatuses, and methods for managing address ranges with different properties within a physical memory address space are contemplated.

Embodiments described herein provide memory systems, apparatuses, and methods to support diverse memory technologies and devices with different internal partitions (e.g., channels, ranks, banks, rows, columns and bits). Embodiments provide systems, apparatuses, and methods to support memory devices using the same technology but having different physical properties (e.g., multiple striping patterns (device address mappings) for incoming physical address ranges for different applications). Embodiments disclosed herein also provide physical device mapping functions based on a particular (e.g., target) memory technology or device.

Embodiments disclosed herein describe managing address range properties and device mappings in different memory technologies by using physical address spaces of memory devices that are divided into multiple logical memory address regions (or logical regions, for short) of non-overlapping, contiguous address ranges of the physical memory address space. In various embodiments, the address ranges of a memory device may be dynamically created and managed. Access patterns, permissions, and properties of each address range may be optimized independent of other address ranges. In addition, the number of bits per cell in the non-volatile memory address ranges may also be managed.

Embodiments may also include different application-specific mapping functions that facilitate efficient performance and energy consumption depending on memory access patterns. In various embodiments, physical address to device address mapping functions may be dynamically configured at run-time (as opposed to setting a function at start up), thereby providing a mechanism to adapt the mapping function to the application kernel's memory access patterns. Memory accesses for the logical memory address regions may further be optimized based on the application kernel that accesses each region. A physical-to-device address mapping function may be selected for a region dynamically at runtime and independent of other regions.

Some non-volatile memory devices support storing multiple bits per cell. For example, PCM devices typically support storing two, three, or four bits per cell. Such multi-level cell (MLC) devices offer higher density at the expense of higher access latency, higher access energy, and lower endurance. Memory parameters (such as latency and capacity) vary between different applications. According to some embodiments, each logical memory address region may operate in either single-level cell (SLC) mode or MLC mode. For example, if a device supports storing up to three bits per cell (called Tri-level cells or 3LC), each logical memory address region can independently operate in either one bit per cell mode, two bits per cell mode, or three bits per cell mode depending on endurance, access latency, access energy, and capacity parameters.

Also contemplated are embodiments in which wear-leveling of each logical region may be managed separately using an algorithm that matches the logical region requirements and capabilities. Each logical region may utilize its own features (such as data encryption, compression) that are not enabled/supported in other logical memory address regions. Each logical region may also include its own access permissions. For example, a particular core may have only read access permission to a given logical region, while another core may have full access permission to the same region.

In various embodiments, different access priorities may be assigned to different logical regions. In such embodiments, a memory controller may manage and prioritize memory accesses based on the target logical region. For example, a logical region that contains data that is less frequently accessed than some other data can have a low access priority while other logical regions that contain latency-sensitive data may have a higher access priority. In such cases, the memory controller may service accesses to the latter region faster. Accordingly, various priorities may be known based on the target logical region without embedding priority data in each access request.

Embodiments are contemplated in which a hybrid memory device is logically divided into regions with different properties. For example, for a PCM+DRAM device, two logical regions may be defined, a DRAM logical region and a PCM logical region. While the DRAM logical region may not use a write management policy, logical regions of the PCM logical region may provide a mechanism to disable/enabled write pausing. More generally, logical memory address regions may be adapted based on the underlying memory technology.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 5 is a block diagram of one embodiment of a logical region table.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
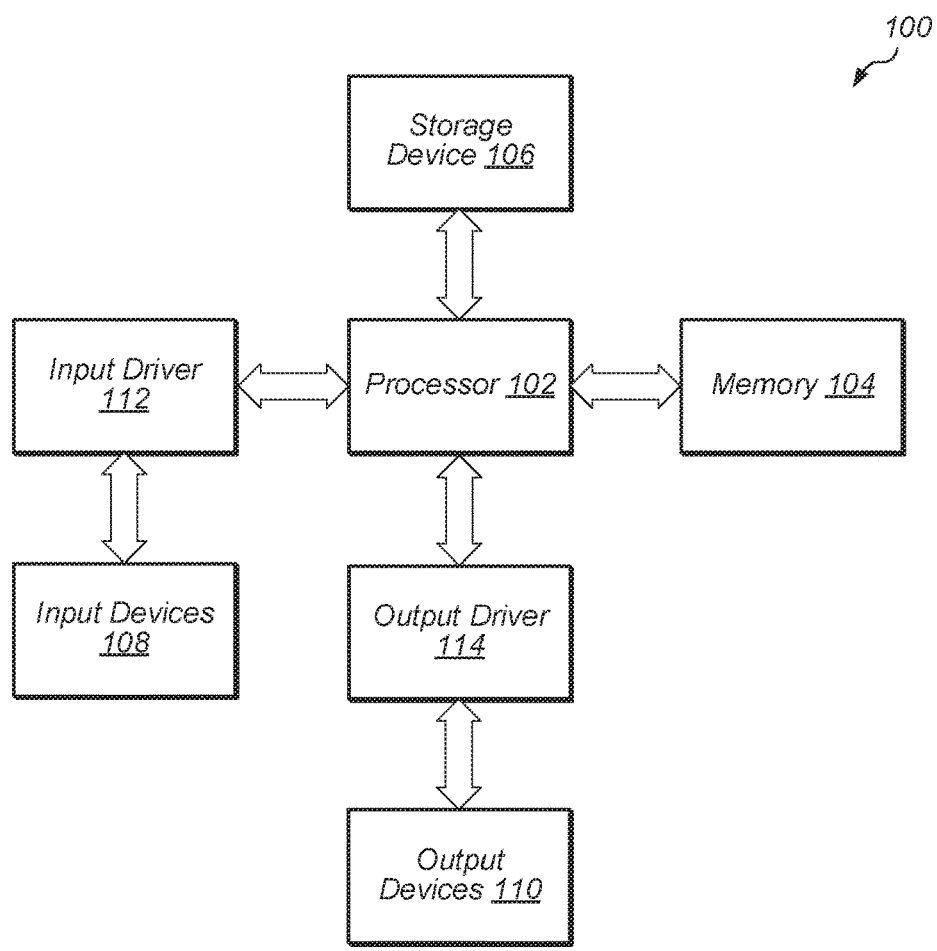
FIG. 1 is a block diagram of one embodiment of a device.

Referring now to FIG. 1, a block diagram of a device 100 in which one or more disclosed embodiments may be implemented is shown. The device 100 may be, for example, a computer, a gaming device, a handheld device, a set-top box, a television, a mobile phone, a tablet computer, a server, or other computing device or system. The device 100 includes a processor 102, a memory 104, a storage device 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The processor 102 may be configured to execute an operating system (OS) and one or more software applications. The memory 104 may be located on the same die as the processor 102, or may be located separately from the processor 102. The memory 104 may include a volatile or non-volatile memory, random access memory (RAM), dynamic RAM, a cache, or other memory.

The storage device 106 may include a fixed or removable storage device, for example, a hard disk drive, a solid state drive, an optical disk, a flash drive, or other device. The input devices 108 may include a keyboard, a keypad, a touch screen, a touch pad, a detector, a microphone, an accelerometer, a gyroscope, a biometric scanner, a network connection (e.g., a wireless local area network card for transmission and/or reception of wireless IEEE 802 signals), or other device. The output devices 110 may include a display, a speaker, a printer, a haptic feedback device, one or more lights, an antenna, a network connection (e.g., a wireless local area network card for transmission and/or reception of wireless IEEE 802 signals), or other device.

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

In one embodiment, processor 102 may be configured to partition the physical memory address space of memory 104 into a plurality of logical memory address regions. Each logical memory address region may be configured and managed separately from the other logical memory address regions. A plurality of applications may execute on processor 102, and the applications may be assigned to logical memory address regions, with each logical memory address region including a plurality of parameters which are optimized for the memory accesses and requirements of the corresponding application. In one embodiment, each application may be assigned to a different logical memory address region. In another embodiment, some applications may share a logical memory address region. In other embodiments, each application may be assigned to two or more logical memory address regions.

Figure 2:
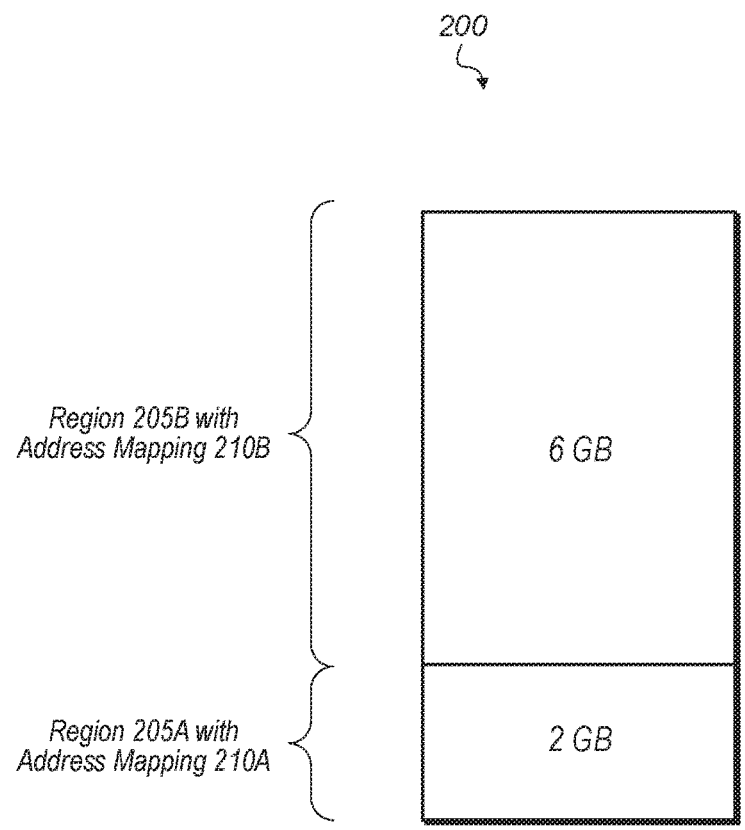
FIG. 2 is a block diagram of one embodiment of a physical address space divided into two logical memory address regions.

Turning now to FIG. 2, a diagram illustrating an exemplary physical memory address space 200 divided into two logical memory address regions (Region 205A and Region 205B) with different capacity and mapping schemes is shown. As shown in FIG. 2, Region 205A has a 2 GB capacity and Region 205B has a 6 GB capacity. Region 205A also includes an address mapping scheme 210A and Region 205B includes an address mapping scheme 210B.

The logical divisions (Region 205A and Region 205B) of the physical memory address space 200 may be specified to program memory controllers (e.g., memory controller 310 in FIG. 3) to support diverse memory types and device address mappings. The logical memory address regions (Region 205A and Region 205B) are non-overlapping, contiguous address ranges of the physical memory address space. The logical memory address regions (Region 205A and Region 205B) are utilized to optimize memory device access patterns and properties of address ranges individually and dynamically. Each logical memory address region, independent from other logical memory address regions, may adopt its own properties that provide performance, bandwidth, and energy benefits for the application that accesses the corresponding region. For example, at least a first attribute of a first plurality of attributes specified for a first logical memory address region may be different from a corresponding attribute of a second plurality of attributes specified for a second logical memory address region. Properties of each region may be optimized dynamically at runtime. Regions may be added, deleted, modified, separated, or merged dynamically. The capacity, size and number of regions shown in FIG. 2 are exemplary. Embodiments may include any number of logical memory address regions having any size and any capacity.

Figure 3:
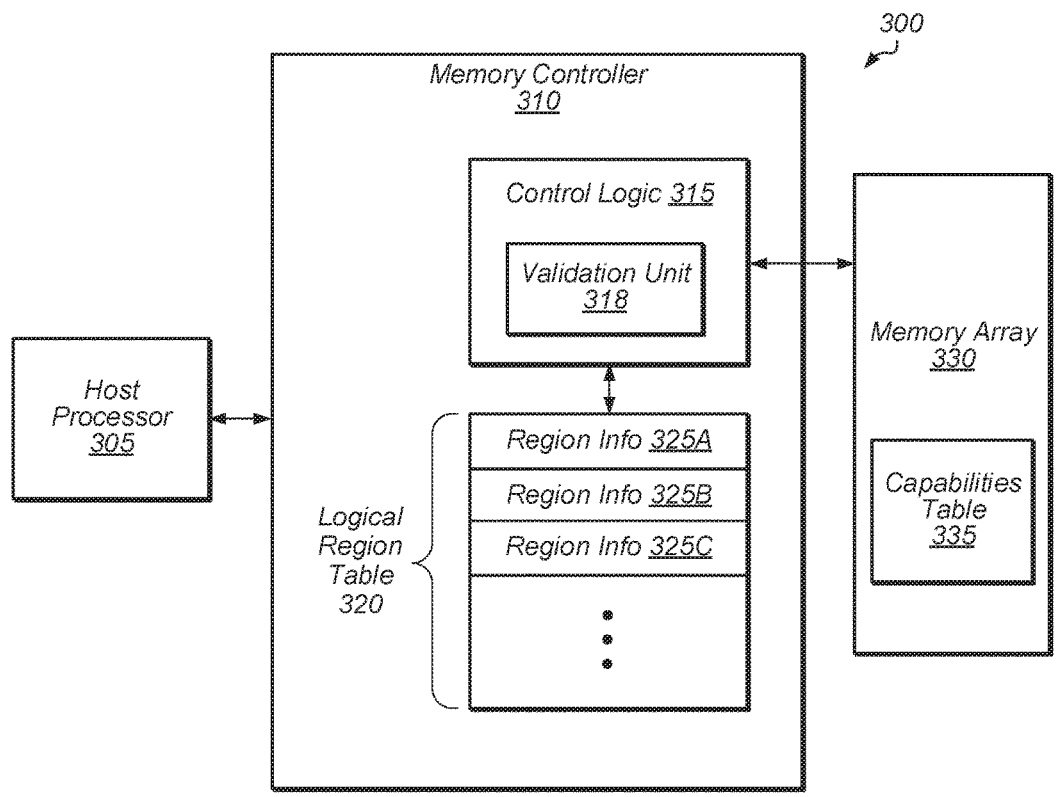
FIG. 3 is a block diagram of one embodiment of a logical memory address range management system.

Referring now to FIG. 3, a diagram illustrating an exemplary logical memory address range management system 300 in which one or more disclosed embodiments may be implemented is shown. System 300 may include host processor 305, memory controller 310, and memory array 330. Depending on the embodiment, memory array 330 may include a single memory device or multiple memory devices. It is noted that memory array 330 may also be referred to as a memory device. Furthermore, depending on the embodiment, memory controller 310 may be physically attached to host processor 305 or memory controller 310 may be physically attached to memory array 330.

As shown in FIG. 3, the system 300 may include a programmable logical region table 320 that includes information corresponding to each logical memory address region (e.g., Region Info 325A, Region Info 325B, Region Info 325C). The logical region table 320 may include configuration data of each logical memory address region. For example, the table may include, for each logical memory address region, information such as region ID, start address, region size, cell-level mode for NVM (SLC/MLC2/4/8/16 bits per cell, 3 bits per cell, 5 bits per cell or otherwise), physical-to-device mapping scheme and address masks, access permissions, wear-leveling data, encryption settings, compression settings, and vendor-specific features. In some embodiments, the contents of the table may be programmed by the host processor 305 and read by the memory controller 310. It is noted that while the term "table" is used herein, such a table may be organized or structured in any of a variety of ways.

Because properties of a logical memory address region, such as its physical address to device (physical-to-device) address mapping, may be configured at runtime, a hardware/firmware unit (e.g., region selector) in the memory controller may select and retrieve information from the table that specifies properties or settings of a logical memory address region and validates the logical memory address region against a specification of the memory device and the memory device's supported capabilities. For example, for a memory device that has 16 banks, the physical-to-device mapping of a logical region cannot specify 32 banks. In one embodiment, validation unit 318 of control logic 315 may be configured to validate the parameters of a logical memory address region against a specification retrieved from capabilities table 335 of the memory array 330. The capabilities table 335 may include information specifying the underlying memory technology and the supported capabilities of memory array 330.

The configuration of logical memory address regions may be added, deleted, and modified (e.g., by the host processor 305) by writing into the logical region table 320. The memory controller 310 may verify the configuration of the logical memory address regions and may send error messages (e.g., back to the host processor 305) if errors (e.g., incorrect configuration) are detected. The memory controller 310 may also indicate completion of NVM cell level change of a region by notifying the host using a Done/Error response. For example, the host processor 305 might change the cell level of a region from SLC to two-bits per cell to increase the region capacity. The memory controller 310 may transfer data to the new cell level configuration, which in some embodiments, may require OS support.

Figure 4:
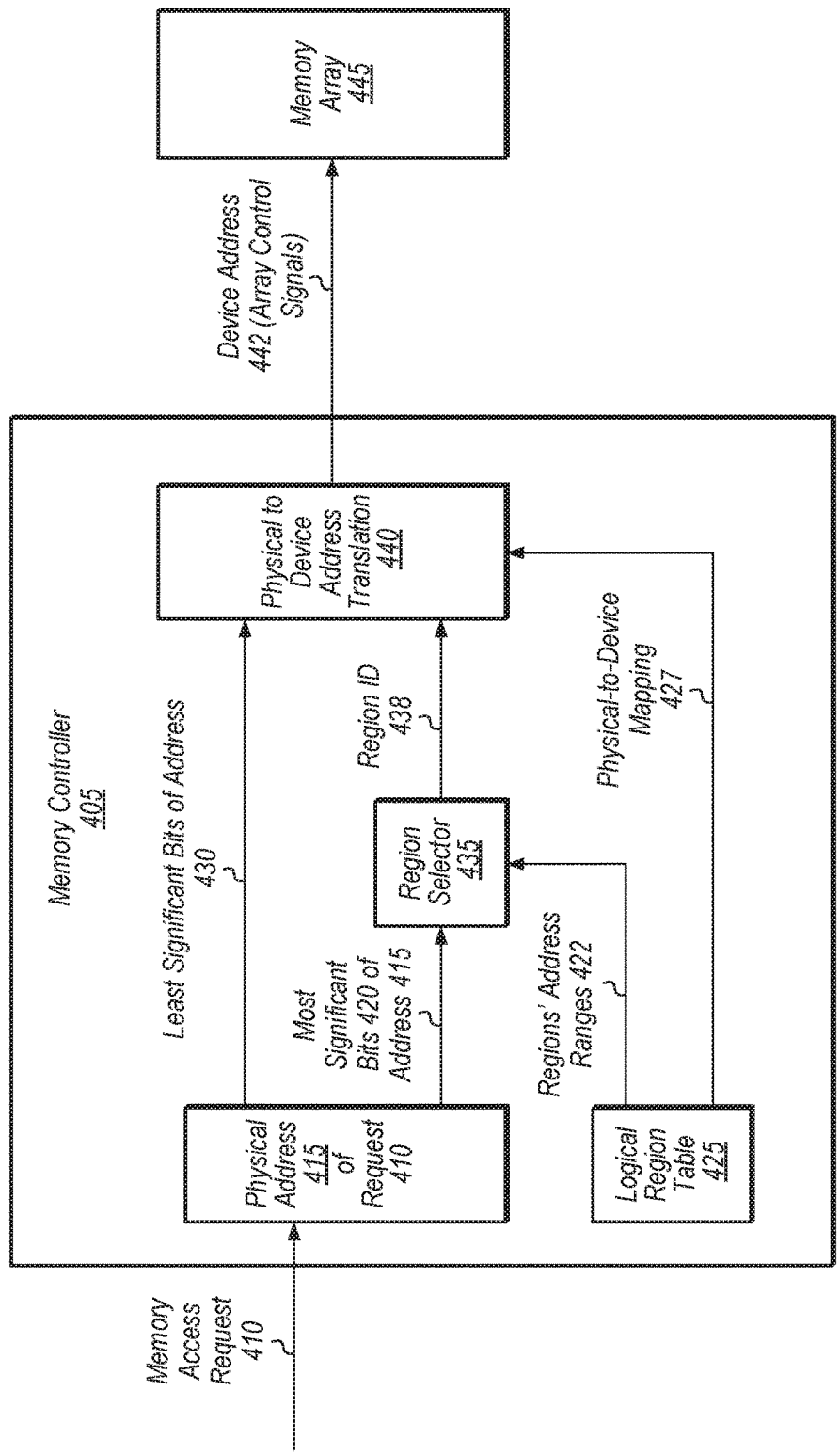
FIG. 4 is a system flow diagram illustrating an exemplary translation of a physical address of a memory access request to a device address in accordance with one embodiment.

Turning now to FIG. 4, a system flow diagram illustrating an exemplary translation of a physical address 415 of a memory access request 410 to a device address 442 according to an embodiment is shown. In one embodiment, the most significant bits 420 of a memory request address 410 and the address ranges 422 of regions may be used to determine which region corresponds to the request. A region selector 435 may select the region corresponding to the request. The system may validate that the physical address belongs to a valid region and the access permission is not violated. For example, requests to range addresses that are not allocated to any logical memory address region may cause an error.

A Region ID 438 corresponding to the selected region and the remaining least significant address bits 430 may be used to perform physical to device address translation 440. Prior to translation, the system may also validate that the memory request accesses a valid address. For example, the capacity of a logical region varies based on the cell level mode (if supported). The system may determine if the physical address 415 of the memory request 410 is an address located outside the available capacity in the logical region. If so, the memory request 410 may be prevented from accessing the memory location.

The address mapping scheme corresponding to the Region ID 438 may read from the logical region table 425 to utilize a physical-to-device mapping 427 to translate the physical address 415 of the memory access request 410 to a device address 442. After translation, the generated control signals may be sent from memory controller 405 to the memory array 445 to access data at the device address 442.

Referring now to FIG. 5, a block diagram of one embodiment of a logical memory address region table 500 is shown. In one embodiment, the fields shown in logical memory address region table 500 may be included within logical region table 425 (of FIG. 4). Logical memory address region table 500 may include a plurality of entries for a plurality of logical memory address regions which are mapped to separate portions of the physical memory address space of the host system's memory devices. Table 500 may include any number of entries, depending on the embodiment. As shown in FIG. 5, table 500 includes entries for logical memory address region IDs 505A, 505B and 505C.

Each entry of table 500 may include a start address field, region size field, cell-level mode field, physical-to-device mapping scheme field, address mask field, access permissions field, wear-leveling data field, vendor-specific features, and one or more other fields. The start address field may specify the starting address of the logical memory address region in the physical memory address space. The region size may specify the total size of the logical memory address region. The cell-level mode field may specify the cell-level mode (e.g., number of bits per cell) for NVMs. The physical-to-device mapping scheme field may specify the striping pattern (e.g., coarseness) that is utilized for writing data to the memory devices. The physical-to-device mapping scheme field may also specify if mirroring or redundancy is employed and the type of mirroring or redundancy. The address mask field may specify the address bit mask to be used with memory requests targeting the logical memory address region. The access permissions field may specify the read, write, and execute permissions for accesses to the logical memory address region.

The wear-leveling data may specify a number of erase-cycles which have been performed to the region. The wear-leveling data may also include data at a finer granularity, for example, for each erase block of the corresponding region. The vendor-specific features field may include data corresponding to the vendors of the memory device(s) to which the region maps. Other fields which may be included in the entries of table 500 may include an encryption field to specify if encryption is enabled and which type of encryption is being utilized and a compression field to specify if compression is enabled and which type of compression is being utilized. It is noted that each entry of table 500 may be programmed separately from the other entries, such that the parameters and attributes of a given region are independent from the parameters and attributes of the other regions. This allows the system to configure each region to meet the needs of the application(s) which are mapped to the region.

Figure 6:
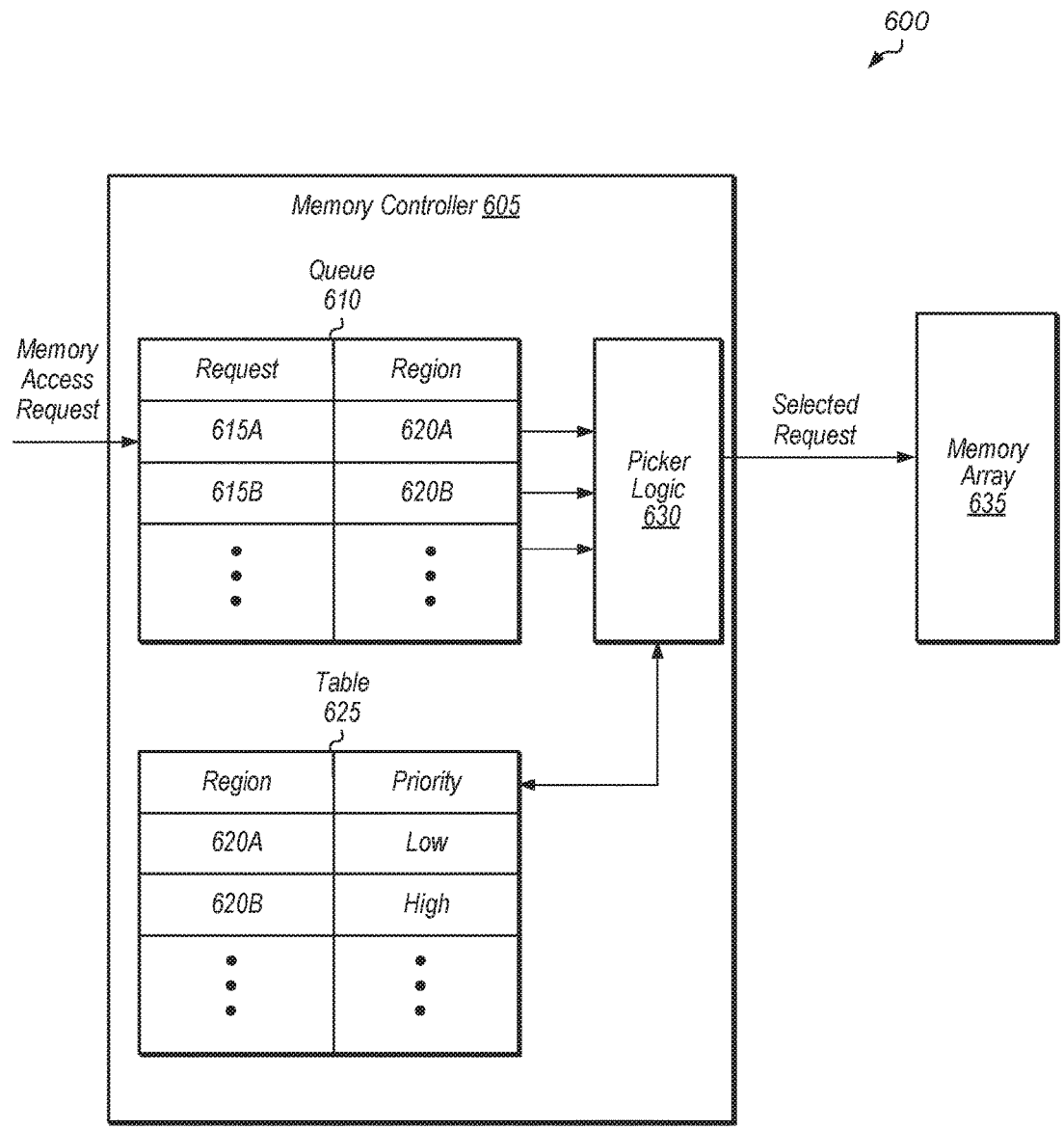
FIG. 6 is a block diagram of one embodiment of a computing system.

Referring now to FIG. 6, a block diagram of a computing system 600 is shown. System 600 may include at least memory controller 605 and memory array 635. Memory controller 605 may be configured to receive memory access requests from a host processor (not shown) and store the requests in queue 610 prior to conveying the requests to memory array 635. Memory controller 605 may include queue 610, table 625, and picker logic 630. Memory controller 605 may also include other logic which is not shown in FIG. 6 to avoid obscuring the figure. Queue 610 may be configured to store incoming requests received from one or more host processors. In other embodiments, memory controller 605 may include multiple queues. For example, memory controller 605 may include a read queue for storing read requests and a write queue for storing write requests. However, a single queue 610 is shown in FIG. 6 for the purposes of simplicity. As shown in queue 610, the request ID and the region which is being targeted by the request are stored as fields in queue 610. In other embodiments, the address may be stored in queue 610, and the memory controller may be configured to determine which logical memory address region (or region, for short) is targeted by the address from a mapping table. When multiple memory access requests are pending at a given time, memory controller 605 may arbitrate between these requests.

In one embodiment, requests sent to memory controller 605 may not include an assigned priority. Rather, the requests may include an address targeted by the request, and then memory controller 605 may determine the region targeted by the request using the request's address. Next, picker logic 630 of memory controller 605 may determine a priority of a request from table 625 by mapping the region ID of a request to a priority assigned to the region. For example, queue 610 is shown as including two requests 615A and 615B. Request 615A targets region 620A of memory array 635, and picker logic 630 may determine from table 625 that requests to region 620A should be processed with a low priority. Also, request 615B targets region 620B of memory array 635, and picker logic 630 may determine from table 625 that requests to region 620B should be processed with a high priority. Accordingly, picker logic 630 may select request 615B prior to request 615A to be conveyed to memory array 635.

Figure 7:
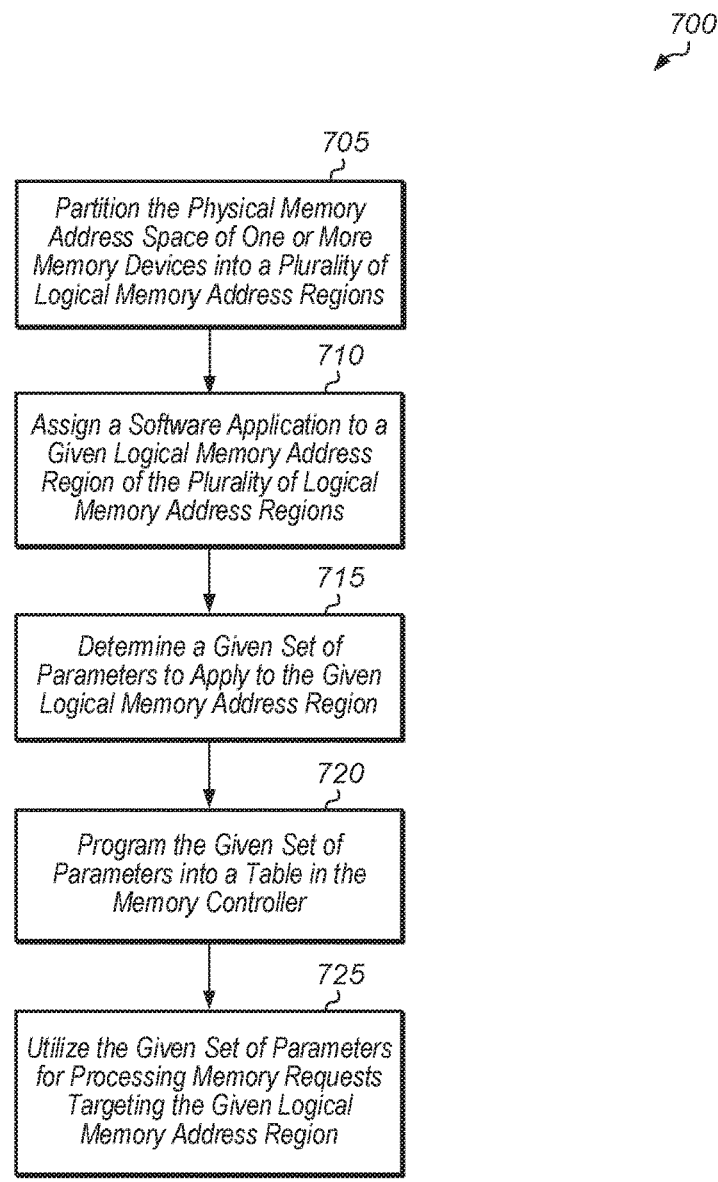
FIG. 7 is a generalized flow diagram illustrating one embodiment of a method for implementing logical memory address regions.

Referring now to FIG. 7, one embodiment of a method 700 for implementing logical memory address regions is shown. For purposes of discussion, the steps in this embodiment are shown in sequential order. However, it should be noted that in various embodiments, one or more of the steps described may be performed concurrently, in a different order than shown, or may be omitted entirely. Other additional steps may also be performed as desired. Similarly, other methods described herein may be presented with steps in a particular sequence. However, those methods may likewise vary as noted above. Any of the various systems or apparatuses described herein may be configured to implement method 700.

In various embodiments an operating system may be configured to partition the physical memory address space of one or more memory devices into one or more logical memory address regions (block 705). The operating system may also be configured to assign a software application (or processes, or threads, etc.) to a given logical memory address region of the plurality of logical memory address regions (block 710). It is noted that a given logical memory address region may be shared among multiple processes. The operating system may further determine a given set of parameters, based on the characteristics of the application and the characteristics of the targeted memory device(s), to apply to the given logical memory address region (block 715). The given set of parameters may include at least a region ID, start address, region size, cell-level mode for NVM (SLC/MLC2/4/8/16 bits per cell), physical-to-device mapping scheme, address masks, access permissions, wear-leveling data, encryption settings, compression settings, vendor-specific features, and other parameters.

Subsequent to determining the parameters, the operating system may program the memory controller to use the parameters (block 720). For example, the parameters may be stored in a table that is used by the memory controller. The memory controller may then utilize the given set of parameters for processing memory requests targeting the given logical memory address region (block 725). For example, a first application may generate a first memory request and convey the first memory request to the memory controller. In response to receiving the first memory request, the memory controller may identify the region targeted by the first memory request. Then, the memory controller may retrieve parameters corresponding to the identified region from the table and process the first memory request based on the values of the retrieved parameters. After block 725, method 700 may end.

Figure 8:
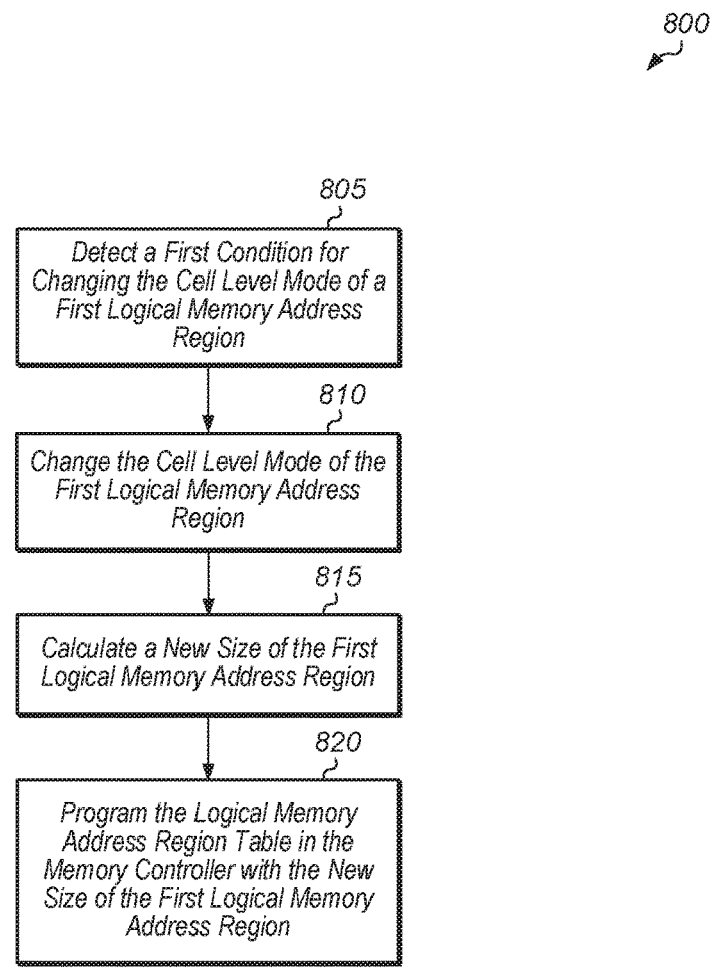
FIG. 8 is a generalized flow diagram illustrating one embodiment of a method for changing the cell level mode of a logical memory address region.

Turning now to FIG. 8, one embodiment of a method 800 for changing the cell level mode of a logical memory address region is shown. Any of the various systems or apparatuses described herein may be configured to implement method 800. An operating system may detect a first condition for changing the cell level mode of a first logical memory address region (block 805). In one embodiment, the first condition may be a change in the characteristics of a first software application which is mapped to the first logical memory address region. For example, the first application may request a reduction in latency for a plurality of memory requests. Alternatively, the first application may request an increase in the size of the first logical memory address region. Other conditions for changing the cell level mode of the first logical memory address region are possible and contemplated.

Responsive to detecting the first condition, the processor may change the cell level mode of the first logical memory address region (block 810). For example, the processor may increase the number of bits per cell (e.g., from 1 to 2). Alternatively, the processor may decrease the number of bits per cell (e.g., from 4 to 2). Responsive to changing the cell level mode, the processor may calculate a new size of the first logical memory address space (block 815). For example, if the number of bit cells is increased from 1 to 2, then the size of the first logical memory address space may double. Next, the processor may program a logical memory address region table in the memory controller with the new size of the first logical memory address space (block 820). After block 820, method 800 may end.

Figure 9:
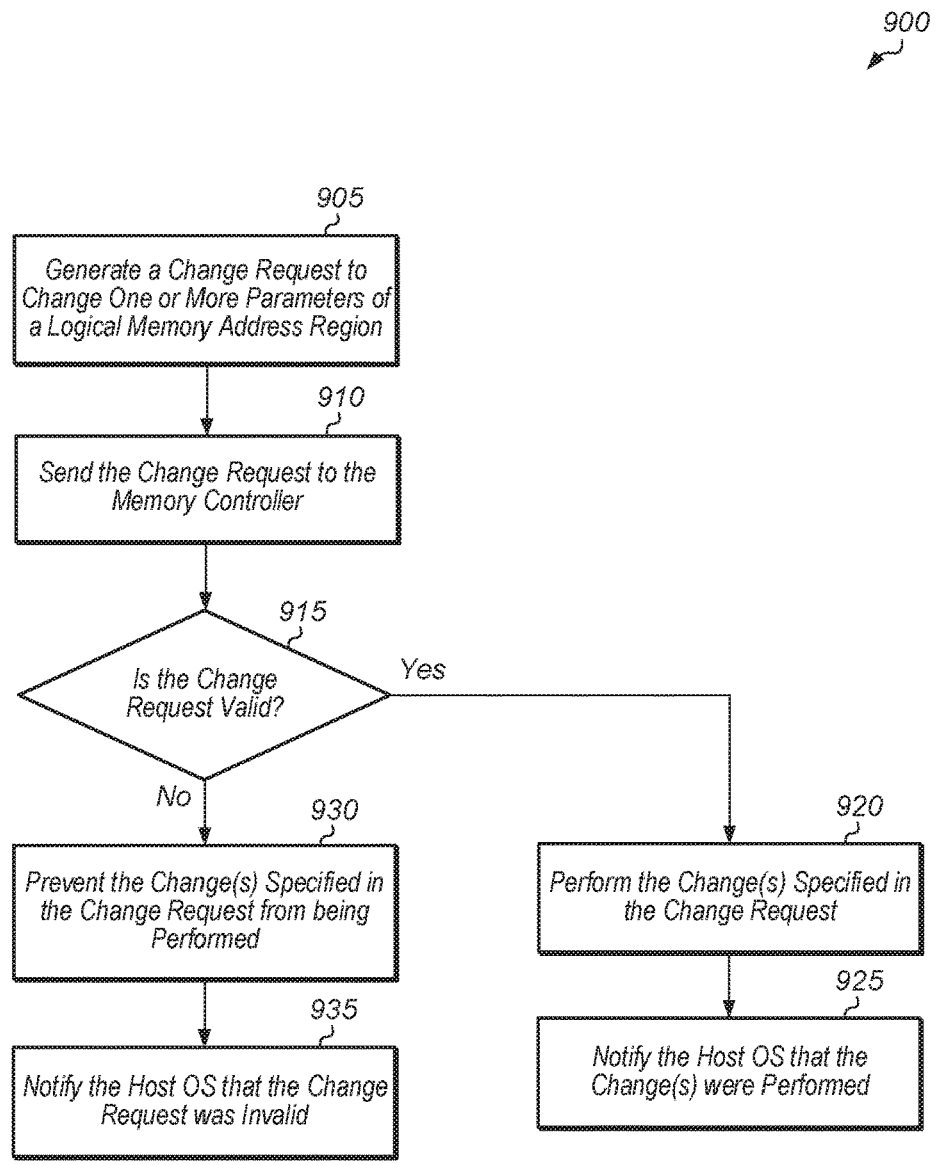
FIG. 9 is a generalized flow diagram illustrating one embodiment of a method for modifying a logical memory address region.

Referring now to FIG. 9, one embodiment of a method 900 for modifying a logical memory address region is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or apparatuses described herein may be configured to implement method 900.

A host operating system (OS) may generate a change request to change one or more parameters of a logical memory address region (block 905). The change request may involve changing one or more of the start address, region size, cell-level mode, physical-to-device mapping scheme, address masks, access permissions, wear-leveling data, encryption settings, compression settings, or other parameters of the logical memory address region. The host OS may send the change request to the memory controller (block 910). The validation unit of the memory controller's control logic may determine if the change request is valid based on characteristics of the underlying memory device (conditional block 915). For example, if the change request specifies changing the cell level mode to 4 bits per cell but the underlying memory device does not support 4 bits per cell, then the change request is invalid. Or, if the change request specifies a physical-to-device mapping that utilizes 32 banks, but the underlying memory device has 16 banks, then the change request is invalid.

If the validation unit determines that the change request is valid (conditional block 915, "yes" leg), then the memory controller may perform the change(s) specified in the change request (block 920). Then, the memory controller may notify the host OS that the change(s) were performed (block 925). If the validation unit determines that the change request is invalid (conditional block 915, "no" leg), then the memory controller may prevent the change(s) from being performed (block 930). Then, the memory controller may notify the host OS that the change request was invalid (block 935). After blocks 925 and 935, method 900 may end.

Figure 10:
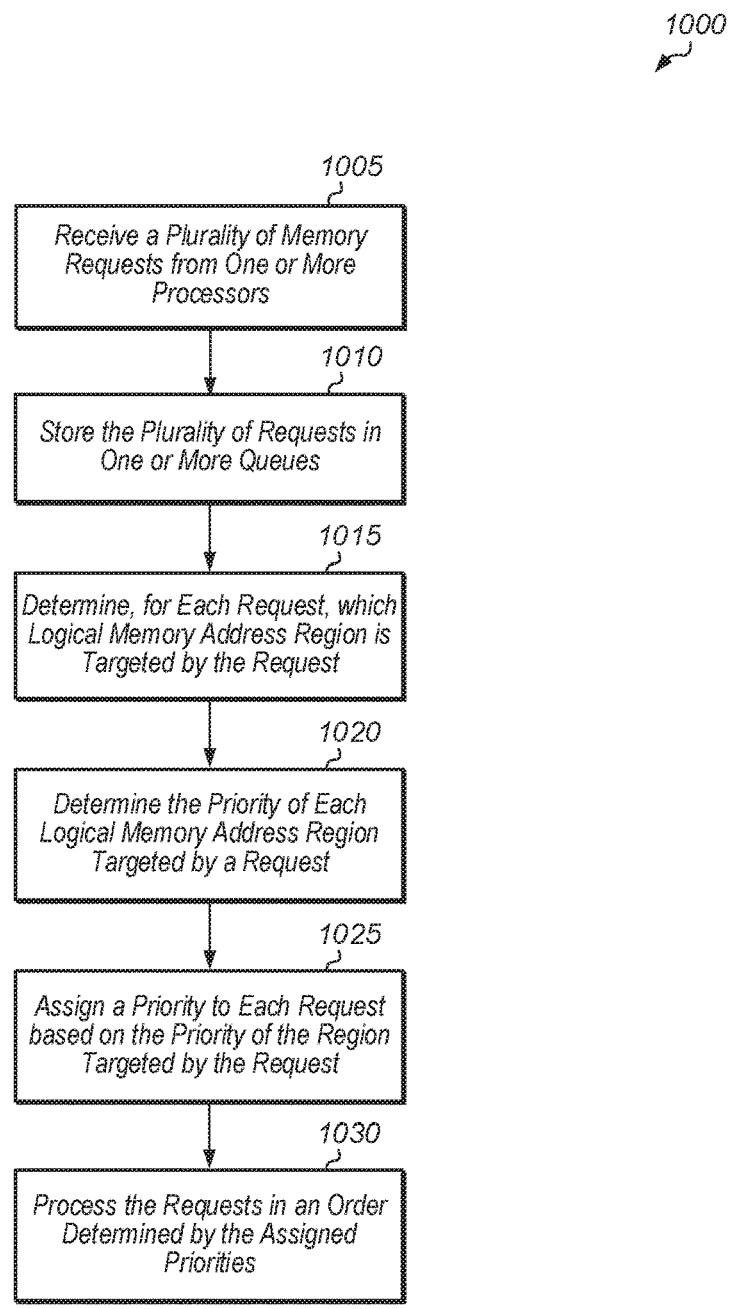
FIG. 10 is a generalized flow diagram illustrating one embodiment of a method for determining the priorities of requests.

Turning now to FIG. 10, one embodiment of a method 1000 for determining the priorities of requests is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or apparatuses described herein may be configured to implement method 1000.

A memory controller may receive a plurality of requests from one or more processors (block 1005). The memory controller may store the plurality of requests in one or more queues (block 1010). Next, for each request, the memory controller may determine which logical memory address region is targeted by the request (block 1015). Then, for each logical memory address region targeted by a request, the memory controller may determine the priority of the logical memory address region from the logical memory address region table (block 1020). Next, the memory controller may assign a priority to each request based on the priority of the region targeted by the request (block 1025). Then, the memory controller may process the requests in an order determined by the assigned priorities (block 1030). After block 1030, method 1000 may end.

Figure 11:
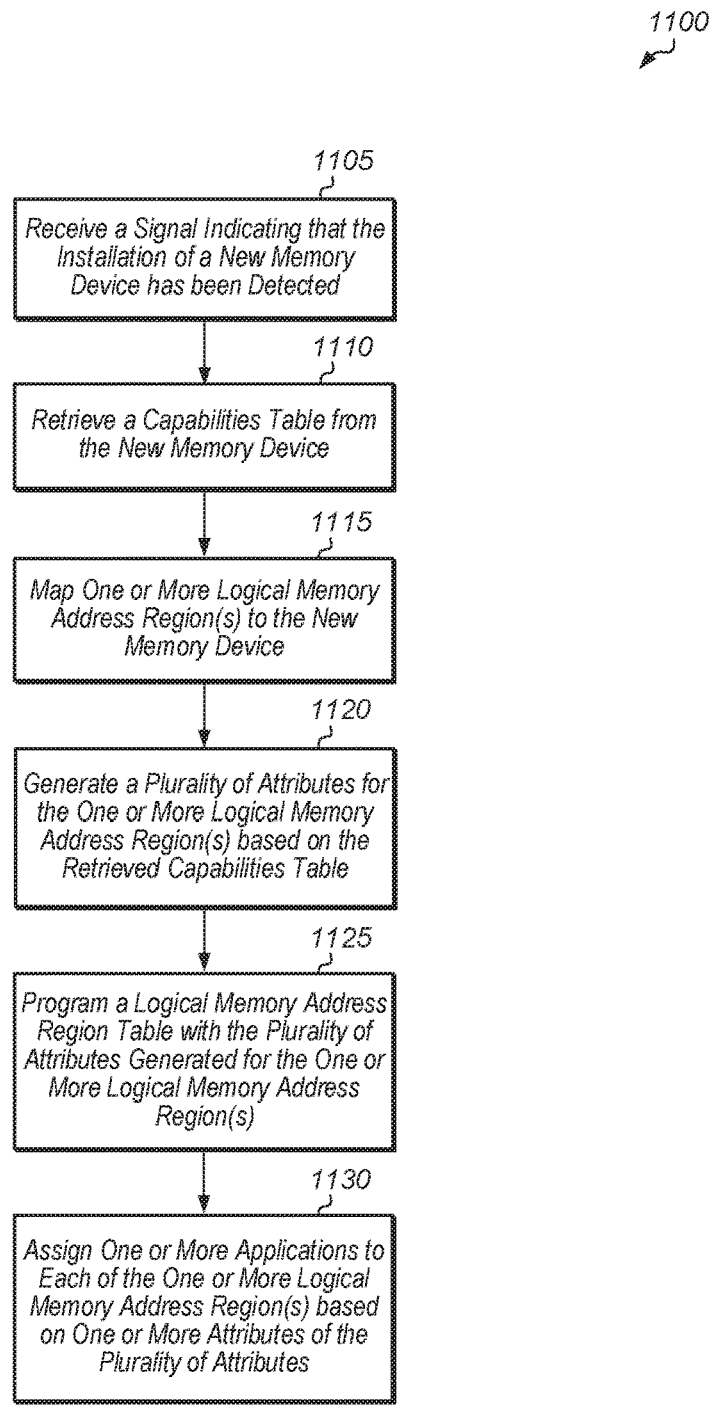
FIG. 11 is a generalized flow diagram illustrating one embodiment of a method for assigning a logical memory address region to a memory device.

Referring now to FIG. 11, one embodiment of a method 1100 for assigning a logical memory address region to a memory device is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or apparatuses described herein may be configured to implement method 1100.

An operating system (OS) may receive a signal indicating that the installation of a new memory device has been detected (block 1105). In response to receiving the signal, the OS may retrieve a capabilities table from the new memory device (block 1110). The capabilities table may include information specifying the underlying memory technology and the supported capabilities of the new memory device. Next, the OS may map one or more logical memory address region(s) to the new memory device (block 1115). Then, the OS may generate a plurality of attributes for the one or more logical memory address region(s) mapped to the new memory device based on the retrieved capabilities table (block 1120). Next, the OS may program a logical memory address region table with the plurality of attributes generated for the one or more logical memory address region(s) (block 1125). Then, the OS may assign one or more applications to each of the one or more logical memory address region(s) based on one or more attributes of the plurality of attributes (block 1130). After block 1130, method 1100 may end.

Figure 12:
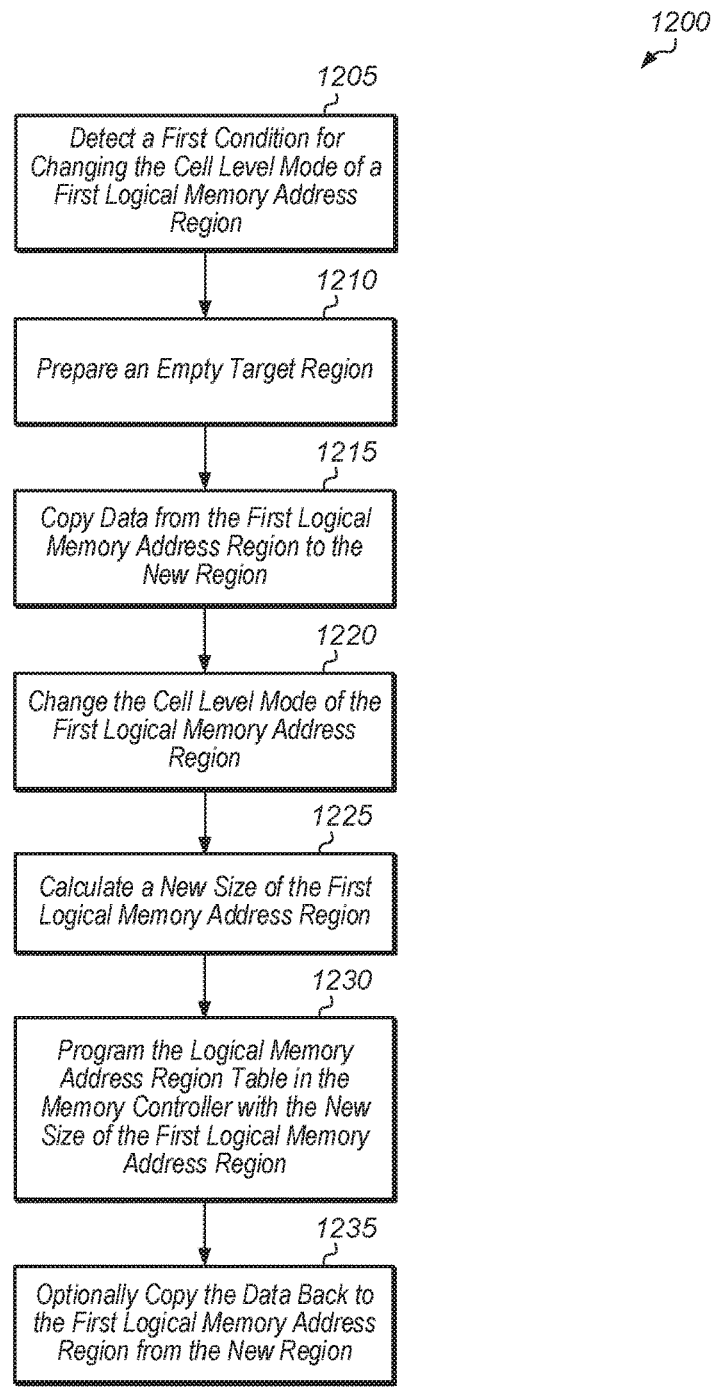
FIG. 12 illustrates one embodiment of a method for changing the cell level mode of a logical memory address region.

Turning now to FIG. 12, another embodiment of a method 1200 for changing the cell level mode of a logical memory address region is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or apparatuses described herein may be configured to implement method 1200.

An operating system may detect a first condition for changing the cell level mode of a first logical memory address region (block 1205). Next, the operating system may prepare an empty target region for storing the existing data of the first logical memory address region (block 1210). Then, the data may be copied from the first logical memory address region to the new region (block 1215).

Next, the processor may change the cell level mode of the first logical memory address region (block 1220). Responsive to changing the cell level mode, the processor may calculate a new size of the first logical memory address space (block 1225). Next, the processor may program a logical memory address region table in the memory controller with the new size of the first logical memory address space (block 1230). Then, the operating system may optionally copy the data back to the first logical memory address region from the new region (block 1235). Alternatively, the operating system may just maintain the data in the new region and access the data from the new region rather than copying the data back to the first logical memory address region. In a further embodiment, the operating system may maintain a first portion of the data in the new region and copy a second portion of the data back to the first logical memory address region. After block 1235, method 1200 may end.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

It is noted that the methods or flow charts provided herein may be implemented in computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computing system during use to provide the program instructions and accompanying data to the computing system for program execution. The computing system may include at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus, comprising:
   one or more processors;
   a memory controller; and
   one or more memory devices;
   wherein the apparatus is configured to:
   partition a physical memory address space of the one or more memory devices into a plurality of logical memory address regions;
   assign a first application to a first logical memory address region of the plurality of logical memory address regions;
   program, into a table, a first plurality of attributes to be applied to the first logical memory address region, wherein the first plurality of attributes are optimized for memory access patterns of the first application;
   program, into the table, a second plurality of attributes to be applied to a second logical memory address region of the plurality of logical memory address regions, wherein at least a first attribute of the first plurality of attributes is different from a corresponding attribute of the second plurality of attributes; and
   utilize the first plurality of attributes for determining how to process a first memory request targeting the first logical memory address region.

2. The apparatus as recited in claim 1, wherein the apparatus is further configured to:
   detect a first condition for changing a cell level mode of the first logical memory address region, wherein the first condition is a change in characteristics of a first software application;
   change the cell level mode of the first logical memory address region;
   calculate a new size of the first logical memory address space; and
   program the table with the new size of the first logical memory address space.

3. The apparatus as recited in claim 2, wherein the apparatus is further configured to:
   prepare a target region for storing existing data of the first logical memory address region;
   copy the existing data from the first logical memory address region to the target region; and
   copy the existing data back to the first logical memory address region from the target region responsive to changing the cell level mode of the first logical memory address region.

4. The apparatus as recited in claim 1, wherein the apparatus further comprises a memory controller, wherein the memory controller is configured to:
   receive a change request to change one or more parameters of the first logical memory address region;
   determine if the change request is valid based on characteristics of the underlying memory device;
   change the one or more parameters of the first logical memory address region responsive to determining that the change request is valid; and
   notify a host operating system that the one or more parameters were changed.

5. The apparatus as recited in claim 4, wherein the memory controller is further configured to:
   receive a plurality of requests, wherein each request of the plurality of requests does not have an embedded priority;
   store the plurality of requests in one or more queues;
   determine which logical memory address region is targeted by each request;
   assign a priority to each request based on a logical memory address region targeted by the request; and process requests in an order determined by priorities assigned to the requests.

6. The apparatus as recited in claim 1, wherein the apparatus is further configured to:
   receive a signal indicating that an installation of a new memory device has been detected;
   retrieve a capabilities table from the new memory device;
   map one or more logical memory address regions to the new memory device;
   generate a third plurality of attributes for the one or more logical memory address regions mapped to the new memory device based on the capabilities table retrieved from the new memory device;
   program the table with the third plurality of attributes; and
   assign one or more applications to each of the one or more logical memory address regions based on the third plurality of attributes.

7. The apparatus as recited in claim 1, wherein the first plurality of attributes comprise a physical-to-device mapping scheme, wear-leveling data, and compression settings, wherein the physical-to-device mapping scheme comprises a striping pattern, type of mirroring employed, and type of redundancy employed.

8. A method, comprising:
   partitioning a physical memory address space of one or more memory devices into a plurality of logical memory address regions;
   assign a first application to a first logical memory address region of the plurality of logical memory address regions;
   programming, into a table, a first plurality of attributes to be applied to the first logical memory address region, wherein the first plurality of attributes are optimized for memory access patterns of the first application;
   programming, into the table, a second plurality of attributes to be applied to a second logical memory address region of the plurality of logical memory address regions, wherein at least a first attribute of the first plurality of attributes is different from a corresponding attribute of the second plurality of attributes; and
   utilizing the first plurality of attributes for determining how to process a first memory request targeting the first logical memory address region.

9. The method as recited in claim 8, further comprising:
   detecting a first condition for changing a cell level mode of the first logical memory address region, wherein the first condition is a change in characteristics of a first software application;
   changing the cell level mode of the first logical memory address region;
   calculating a new size of the first logical memory address space; and
   programming the table with the new size of the first logical memory address space.

10. The method as recited in claim 9, further comprising:
    preparing a target region for storing existing data of the first logical memory address region;
    copying the existing data from the first logical memory address region to the target region; and
    copying the existing data back to the first logical memory address region from the target region responsive to changing the cell level mode of the first logical memory address region.

11. The method as recited in claim 8, further comprising:
    receiving a change request to change one or more parameters of the first logical memory address region;
    determining if the change request is valid based on characteristics of the underlying memory device;
    changing the one or more parameters of the first logical memory address region responsive to determining that the change request is valid; and
    notifying a host operating system that the one or more parameters were changed.

12. The method as recited in claim 11, further comprising:
    receiving a plurality of requests, wherein each request of the plurality of requests does not have an embedded priority;
    storing the plurality of requests in one or more queues;
    determining which logical memory address region is targeted by each request;
    assigning a priority to each request based on a logical memory address region targeted by the request; and
    processing requests in an order determined by priorities assigned to the requests.

13. The method as recited in claim 8, further comprising:
    receiving a signal indicating that an installation of a new memory device has been detected;
    retrieving a capabilities table from the new memory device
    mapping one or more logical memory address regions to the new memory device;
    generating a third plurality of attributes for the one or more logical memory address regions mapped to the new memory device based on the capabilities table retrieved from the new memory device;
    programming the table with the third plurality of attributes; and
    assigning one or more applications to each of the one or more logical memory address regions based on the third plurality of attributes.

14. The method as recited in claim 8, wherein the first plurality of attributes comprise a physical-to-device mapping scheme, wear-leveling data, and compression settings, wherein the physical-to-device mapping scheme comprises a striping pattern, type of mirroring employed, and type of redundancy employed.

15. A system, comprising:
    one or more memory devices; and
    a processor;
    wherein the processor is configured to execute program instructions configured to:
      partition a physical memory address space of the one or more memory devices into a plurality of logical memory address regions;
      assign a first application to a first logical memory address region of the plurality of logical memory address regions;
      program, into a table, a first plurality of attributes to be applied to the first logical memory address region, wherein the first plurality of attributes are optimized for memory access patterns of the first application;
      program, into the table, a second plurality of attributes to be applied to a second logical memory address region of the plurality of logical memory address regions, wherein at least a first attribute of the first plurality of attributes is different from a corresponding attribute of the second plurality of attributes; and
      utilize the first plurality of attributes for determining how to process a first memory request targeting the first logical memory address region.

16. The system as recited in claim 15, wherein the processor is further configured to:

detect a first condition for changing a cell level mode of the first logical memory address region, wherein the first condition is a change in characteristics of a first software application change the cell level mode of the first logical memory address region;

calculate a new size of the first logical memory address space; and program the table with the new size of the first logical memory address space.

17. The system as recited in claim 16, wherein the processor is further configured to:

prepare a target region for storing existing data of the first logical memory address region;

copy the existing data from the first logical memory address region to the target region; and copy the existing data back to the first logical memory address region from the target region responsive to changing the cell level mode of the first logical memory address region.

18. The system as recited in claim 15, wherein the system further comprises a memory controller, wherein the memory controller is configured to:

receive a change request to change one or more parameters of the first logical memory address region;

determine if the change request is valid based on characteristics of the underlying memory device;

change the one or more parameters of the first logical memory address region responsive to determining that the change request is valid; and notify a host operating system that the one or more parameters were changed.

19. The system as recited in claim 18, wherein the memory controller is further configured to:

receive a plurality of requests, wherein each request of the plurality of requests does not have an embedded priority;

store the plurality of requests in one or more queues;

determine which logical memory address region is targeted by each request;

assign a priority to each request based on a logical memory address region targeted by the request; and process requests in an order determined by priorities assigned to the requests.

20. The system as recited in claim 15, wherein the processor is further configured to:

receive a signal indicating that an installation of a new memory device has been detected;

retrieve a capabilities table from the new memory device;

map one or more logical memory address regions to the new memory device;

generate a third plurality of attributes for the one or more logical memory address regions mapped to the new memory device based on the capabilities table retrieved from the new memory device;

program the table with the third plurality of attributes; and assign one or more applications to each of the one or more logical memory address regions based on the third plurality of attributes.

* * * * *